US010591667B2

(12) United States Patent
Kristensen et al.

(10) Patent No.: US 10,591,667 B2
(45) Date of Patent: Mar. 17, 2020

(54) OPTICAL FIBER WITH SPECIALIZED FIGURE-OF-MERIT AND APPLICATIONS THEREFOR

(71) Applicant: OFS Fitel, LLC, Norcross, GA (US)

(72) Inventors: Poul Kristensen, Valby (DK); Philip G Westergaard, Frederiksberg C (DK)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 15/970,990

(22) Filed: May 4, 2018

(65) Prior Publication Data

US 2018/0335564 A1    Nov. 22, 2018

Related U.S. Application Data

(60) Provisional application No. 62/508,583, filed on May 19, 2017.

(51) Int. Cl.
    *G02B 6/02*     (2006.01)
    *G02B 6/036*     (2006.01)

(52) U.S. Cl.
    CPC ..... *G02B 6/02271* (2013.01); *G02B 6/02214* (2013.01); *G02B 6/03633* (2013.01); *G02B 6/03661* (2013.01); *G02B 6/03666* (2013.01)

(58) Field of Classification Search
None
See application file for complete search history.

(56) References Cited

U.S. PATENT DOCUMENTS

| | | |
|---|---|---|
| 6,141,142 A | 10/2000 | Espindola et al. |
| 6,490,398 B2 | 12/2002 | Gruner-Nielsen et al. |
| 6,606,437 B1 | 8/2003 | Mukasa et al. |
| 6,765,943 B2 | 7/2004 | Jewell |
| 6,904,217 B2* | 6/2005 | Kalish ............... C03B 37/01228 359/334 |
| 6,925,237 B2 | 8/2005 | Hebgen et al. |
| 7,184,144 B2 | 2/2007 | Sanders |
| 7,274,848 B1 | 9/2007 | Mishra |
| 7,916,768 B2 | 3/2011 | Chang et al. |
| 7,940,816 B2 | 5/2011 | Nicholson |
| 8,472,770 B2* | 6/2013 | Fini ........................ G02B 6/036 385/126 |
| 8,537,866 B2 | 9/2013 | Lin |
| 8,625,091 B2 | 1/2014 | Villeneuve et al. |

(Continued)

OTHER PUBLICATIONS

Wei, Xiaoming et al., "Ultrafast time-stretch imaging at 932 nm through a new highly-dispersive fiber", Biomedical Optics Express, vol. 7, No. 12, Dec. 1, 2016, p. 5208-5217.

(Continued)

*Primary Examiner* — Tina M Wong
(74) *Attorney, Agent, or Firm* — Wendy W. Koba, Esq.

(57) ABSTRACT

A specialized, dispersion-controlled fiber is particularly configured to exhibit a relatively uniform dispersion (D) over a broad spectral range (for example, 1000 nm to 2000 nm). The specialized fiber exhibits an essentially constant attenuation (α) over this same spectral range so that the fiber is defined as having a high "figure of merit" (FoM) where FoM is defined as $|D|/\alpha$. The specialized fiber is well-suited for use as a pulse stretcher, providing the ability to separate out wavelength constituents of an extremely short (fs, ps) broadband pulse into the ns range, for example.

8 Claims, 8 Drawing Sheets

(56) References Cited

U.S. PATENT DOCUMENTS

| | | |
|---|---|---|
| 8,644,664 B2 | 2/2014 | Molin et al. |
| 9,176,275 B2 | 11/2015 | Gruner-Nielsen et al. |
| 9,304,038 B2 | 4/2016 | Saxer et al. |
| 9,518,866 B2 | 12/2016 | Feitisch et al. |
| 2002/0006259 A1* | 1/2002 | Tirloni ............... G02B 6/02242 385/127 |
| 2002/0172483 A1* | 11/2002 | MacChesney ........... G02B 6/02 385/124 |
| 2003/0108317 A1 | 6/2003 | Qi et al. |
| 2003/0180019 A1* | 9/2003 | Tirloni ............... G02B 6/02014 385/127 |
| 2007/0206910 A1* | 9/2007 | Ramachandran .. G02B 6/02095 385/123 |
| 2009/0290841 A1* | 11/2009 | Borel ................. G02B 6/03688 385/127 |
| 2009/0297142 A1 | 12/2009 | Szafraniec et al. |
| 2011/0097046 A1 | 4/2011 | Gruner-Nielsen et al. |
| 2014/0334787 A1* | 11/2014 | Hammerle ........... G02B 6/0288 385/124 |
| 2015/0260910 A1* | 9/2015 | Taunay .............. G02B 6/03644 385/127 |
| 2017/0022094 A1* | 1/2017 | Yan ................... C03B 37/01208 |
| 2018/0335564 A1* | 11/2018 | Kristensen ......... G02B 6/02214 |

OTHER PUBLICATIONS

Gao, Shiming, et al., "Wavelength conversion of spectrum-sliced broadband amplified spontaneous emission light by hybrid four-wave mixing in highly nonlinear, dispersion-shifted fibers", Optics Express, Apr. 3, 2006/vol. 14, No. 7, pp. 2873-2879.

Goda, Keisuke, "Theory of amplified dispersive Fourier Transformation", Physical Review A 80, 043821 (2009), pp. 043821-1-043821-12.

Khare, Rajeev and Shukla, Paritosh K. (2010), "Temporal Stretching of Laser Pulses, Coherence and Utrashort Pulse Laser Emission", Dr. F. J. Duarte (Ed.), http://www.intechopen.com/books/coherence-and-ultrashort-pulse-laser-emission/temporal-stretching-of-laser-pulses.

* cited by examiner

OPTICAL FIBER WITH SPECIALIZED FIGURE-OF-MERIT AND APPLICATIONS THEREFOR

CROSS-REFERENCE TO RELATED APPLICATIONS

This application claims the benefit of U.S. Provisional Application Ser. No. 62/508,583 filed May 19, 2017, and hereby incorporated by reference.

TECHNICAL FIELD

The present invention relates to a dispersion-controlled optical fiber and, more particularly, to a dispersion-controlled optical fiber configured to exhibit a relatively high figure-of-merit (FoM) over a relatively broad spectral range, useful in time-based instrumentation applications, for example.

BACKGROUND OF THE INVENTION

Beyond serving as a transmission medium for voice and data communications, optical fibers are often used for applications involving sensing, measuring, and various types of instrumentations. At times, the specific properties of a conventional transmission optical fiber are not appropriate for these specialized applications. For example, measurement systems may require high speed operation while using a high intensity optical source. Receiver components for these systems may further require that the received optical signal exhibit a relatively low noise level in order recover the desired signal. In situations where the instruments are operated over a relatively wide bandwidth, it becomes even more difficult to meet the requirements of low noise, high intensity and high speed operation.

SUMMARY OF THE INVENTION

The needs remaining in the prior art are addressed by the present invention, which relates to a dispersion-controlled optical fiber and, more particularly, to a dispersion-controlled optical fiber configured to exhibit a relatively high figure-of-merit (FoM) over a relatively broad spectral range. The FoM is defined as $|D|/\alpha$, where D is the chromatic dispersion value of an optical signal propagating through the fiber (which could be either positive or negative; the FoM is determined utilizing the absolute value) and $\alpha$ is the attenuation of the signal as a function of distance along the fiber.

An exemplary specialized, dispersion-controlled fiber formed in accordance with the present invention exhibits a dispersion value that is high enough (e.g., larger in absolute value than about 50 ps/nm/km) to separate constituent wavelengths within an ultrashort pulse. For the purposes of the present invention, an "ultrashort pulse" is considered to be a pulse on the order of picoseconds (ps) or femtoseconds (fs) in duration, with the dispersion sufficient to spread the pulse to occupy a nanosecond (ns), or longer, time interval when the pulse is applied as an input to the specialized dispersion-controlled fiber. The FoM of the specialized, dispersion-controlled fiber is configured to be sufficiently uniform such that the signal-to-noise ratio (SNR) of the time-stretched broadband pulse exiting the fiber is relatively high and avoids the need for an expensive, complicated detector arrangement to be used to produce the spectral response output. Said another way, a relatively uniform FoM avoids the possibility that a conventional photodetector will be saturated when measuring intensities across a wide spectral band.

In accordance with one or more exemplary embodiments of the present invention, a specialized dispersion-controlled optical fiber is configured to exhibit a relatively high and uniform FoM over the wavelength range of 1000-2000 nm, and more particularly over the wavelength range of 1000-1800 nm, and for selected applications over the wavelength range of 1200-1700 nm.

An exemplary utilization of the inventive specialized fiber is in the context of a dispersive Fourier transform optical instrumentation system (for example, an optical spectrometer). In this configuration, the specialized fiber is used as a "pulse stretcher" to increase the time duration of a broadband pulse prior to its arrival at the photodetector performing optical measurements. The detector is particularly configured to correlate the arrival times of a set of optical power measurements with a set of defined wavelengths, so as to provide the desired spectral response (i.e., perform a Fourier transform between the time and frequency domains).

Other and further embodiments of the present invention will become apparent during the course of the following discussion and by reference to the accompanying drawings.

BRIEF DESCRIPTION OF THE DRAWINGS

Referring now to the drawings.

DETAILED DESCRIPTION

A specialized, dispersion-controlled optical fiber is proposed that exhibits a relatively high and uniform FoM that is particularly well-suited for time-based measurement systems. The following discussion will first describe exemplary parameters of the specialized, dispersion-controlled fiber itself, followed by a discussion of the principles of "pulse stretching" in accordance with such a fiber and, lastly, a description of an exemplary application of the specialized, dispersion-controlled fiber in an optical spectrometer application.

Specialized Dispersion-Controlled Fiber

Figure 1:
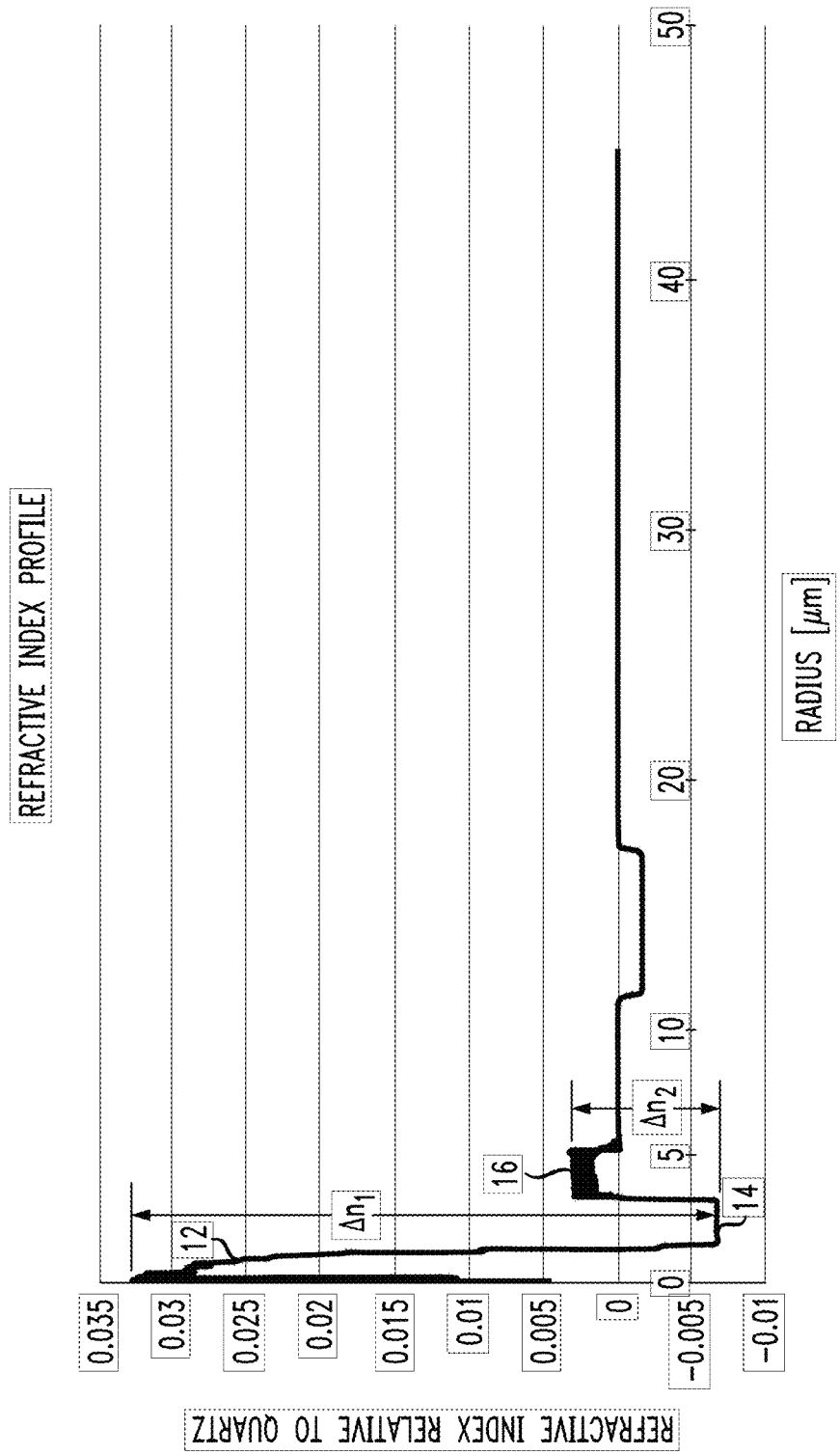
FIG. 1 is a plot of the refractive index profile of an exemplary specialized, dispersion-controlled optical fiber formed in accordance with the present invention.
Figure 2:
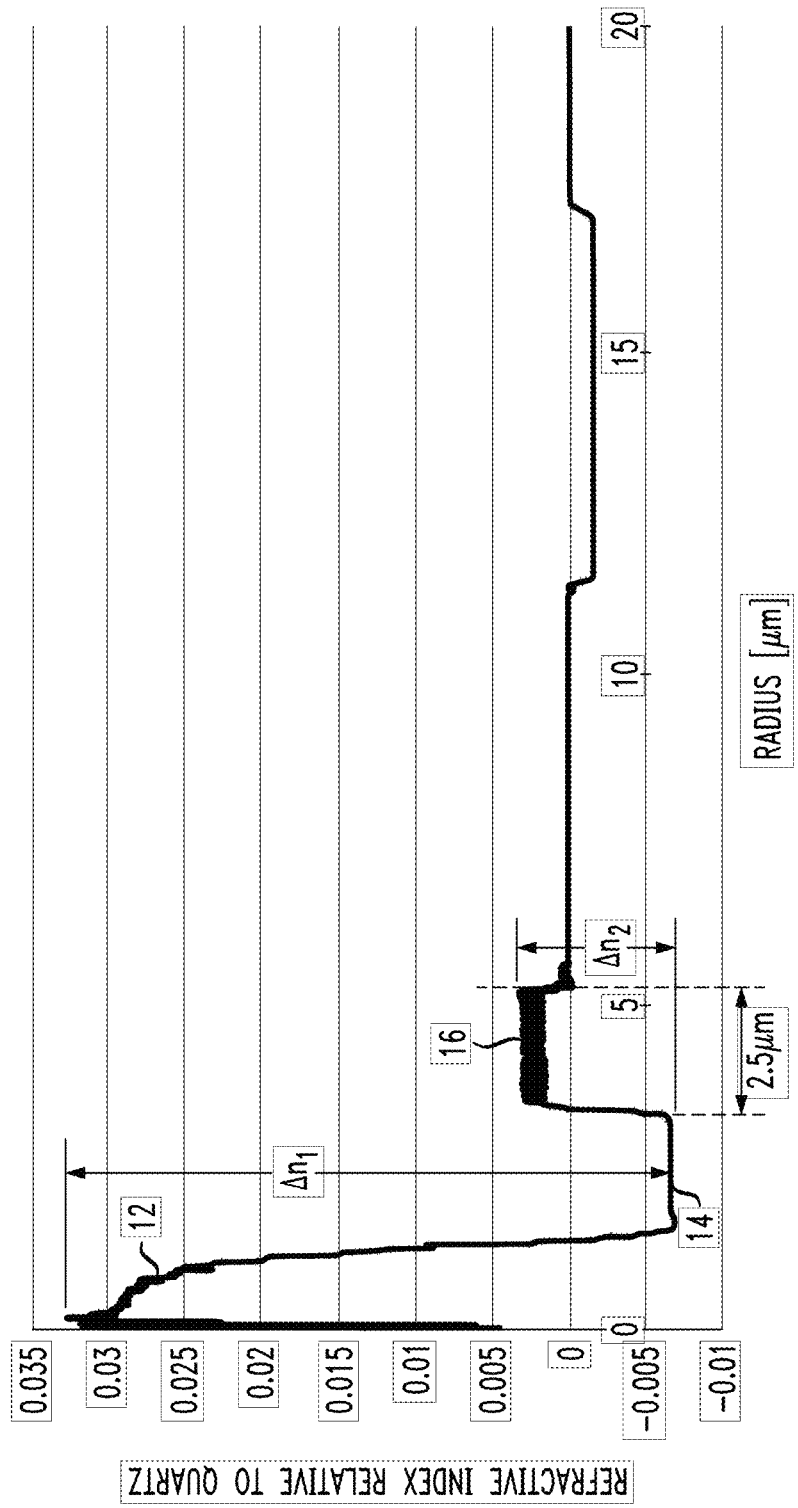
FIG. 2 is an enlarged portion of the refractive index profile of FIG. 1, better illustrating the refractive index values extending outward about 20 µm from the center of the core.
Figure 3:
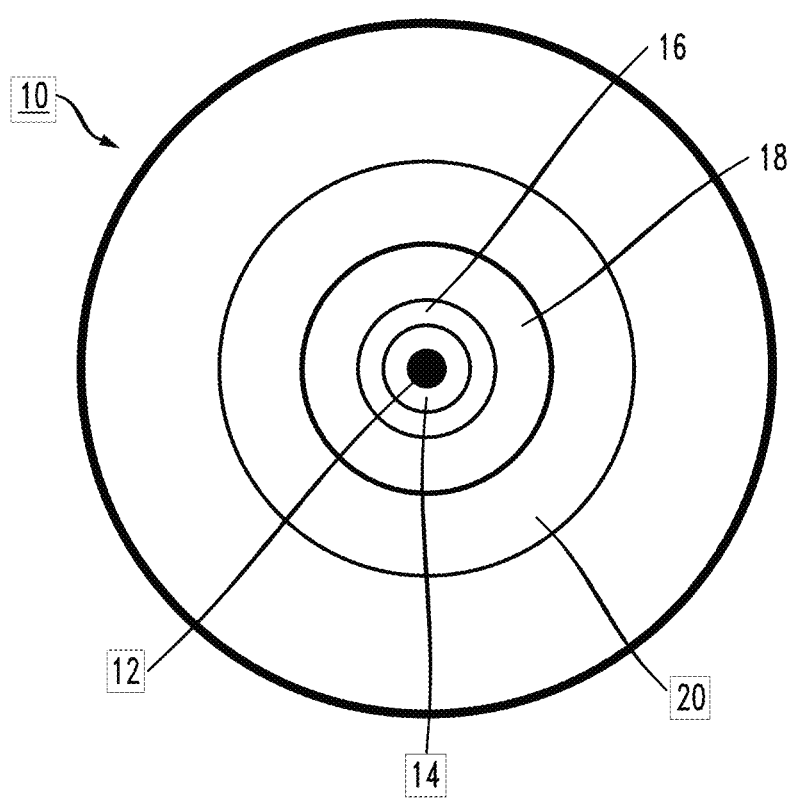
FIG. 3 is a cross-sectional view of an exemplary specialized, dispersion-controlled optical fiber formed in accordance with the present invention.

FIG. 1 is a refractive index profile of an exemplary specialized, dispersion-controlled optical fiber 10 formed in accordance with the principles of the present invention, where FIG. 2 is an expanded view of the profile from the center of the fiber core extending radially outward to about 20 μm from the core center. FIG. 3 is a cross-sectional view of an exemplary specialized, dispersion-controlled fiber 10.

Referring collectively to FIGS. 1-3, exemplary fiber 10 is shown as comprising a small diameter inner core region 12 that exhibits a relatively high refractive index value. The diameter of inner core region 12 may be on the order of, for example, 2-4 μm. The actual refractive index value at the center of inner core region 12 is a function of the concentration of an appropriate dopant (such as Ge, for example) used to raise the refractive index value of silica glass. Surrounding inner core region 12 is a narrow down-doped trench 14, which may be doped with fluorine (F), for example, to reduce its refractive index to a value that is below that of silica. Narrow, down-doped trench 14 may be formed to have a thickness substantially the same as the radius of inner core region 12, with the combination having a diameter in the range of 4-8 μm, for example. The large difference in refractive index values between inner core region 12 and trench 14 is clearly shown in FIGS. 1 and 2, identified as $\Delta n_1$. The value of $\Delta n_1$ for the purposes of the present invention may be about 0.037 or greater in some cases, and in other cases having an exemplary range of about 0.020-0.050, with a preferred range being about 0.030-0.040.

An outer core region 16 is disposed to surround trench 14 and exhibits a slightly positive (with respect to silica) refractive index value. The difference in refractive index value between trench 14 and outer core region 16 is shown as $\Delta n_2$ in FIGS. 1 and 2. In some embodiments of the present invention, the value of $\Delta n_2$ is in the range of about 0.005-0.015. In the particular embodiment of the present invention associated with FIGS. 1-3, the combination of inner core region 12, trench 14, and outer core region 16 forms a complete core of a relatively small diameter, on the order of about 11 μm (for example), with a preferred range for the core diameter being about 8-20 μm and 10 μm being an exemplary value.

An inner cladding 18 of pure silica is disposed around outer core region 16, and an outer cladding 20 of slightly lower refractive index value is disposed around inner cladding 18. In the specific embodiment associated with FIGS. 1-3, inner cladding 18 and outer cladding 20 are formed of about the same thickness. A coating layer 22 is shown in FIG. 3 as disposed to cover outer cladding layer 20. It is to be understood that this specific arrangement of layers and refractive index values is exemplary only, and other combinations may be utilized in accordance with the present invention.

Specialized, dispersion-controlled fiber 10 is configured in the manner shown above to exhibit a relatively high and uniform FoM over a relatively wide spectral range. The FoM of an optical fiber is defined as follows:

$$FoM = |D|/\alpha,$$

where |D| is the absolute value of the chromatic (i.e., wavelength-dependent) dispersion (measured in (ps/nm)/km) and α is the loss (attenuation) also measured as a function of wavelength per unit length. Dispersion describes the asymptotic temporal pulse spreading (Δt) per unit bandwidth (Δλ) per unit distance traveled through the optical fiber (thus the measurement in units of (ps/nm)/k). Dispersion D(ω) is defined as follows:

$$D(\omega) = \frac{-2\pi c}{\lambda^2} \beta_2(\omega),$$

where $\beta_2(\omega)$ is the group velocity dispersion.

As will be described below, these attributes of the FoM allow for an ultrashort, broadband pulse to propagate through a section of specialized, dispersion-controlled fiber 10 of length L and be "stretched" in time to sufficiently separate out its various constituent wavelengths such that a standard receiver is able to perform intensity measurements for each constituent wavelength. That is, the receiver functions to measure intensity as a function by time. By knowing a priori the dispersion characteristic of the specialized dispersion-controlled fiber, the receiver is able to "map" the intensity values measured as a function of time to the appropriate constituent wavelength values (referred to at times hereinafter as "time-to-wavelength" mapping).

The specific properties ("high" and "uniform") of the FoM are important in determining the spectral range over which pulse stretching in accordance with the present invention is possible. While standard optical fiber may exhibit a relatively uniform FoM, its dispersion value is only about 20 ps/nm/km, which is too low to sufficiently spread out the constituent wavelengths within a broadband pulse in a manner where a conventional receiver is able to associate measured intensities with their respective wavelengths (i.e., the dispersion value is too low to allow for a ps or fs pulse to be "stretched" into a ns-length pulse over a fiber of standard length). Conventional dispersion-compensated fiber (DCF) is known to exhibit a relatively high dispersion (between 150 and 200 ps/nm/k) but only over a narrow wavelength range. As a result, neither standard optical fiber nor conventional DCF are particularly well-suited for pulse stretching applications over a wide spectral range, such as the wavelength range of 1000-2000 nm.

Figure 4:
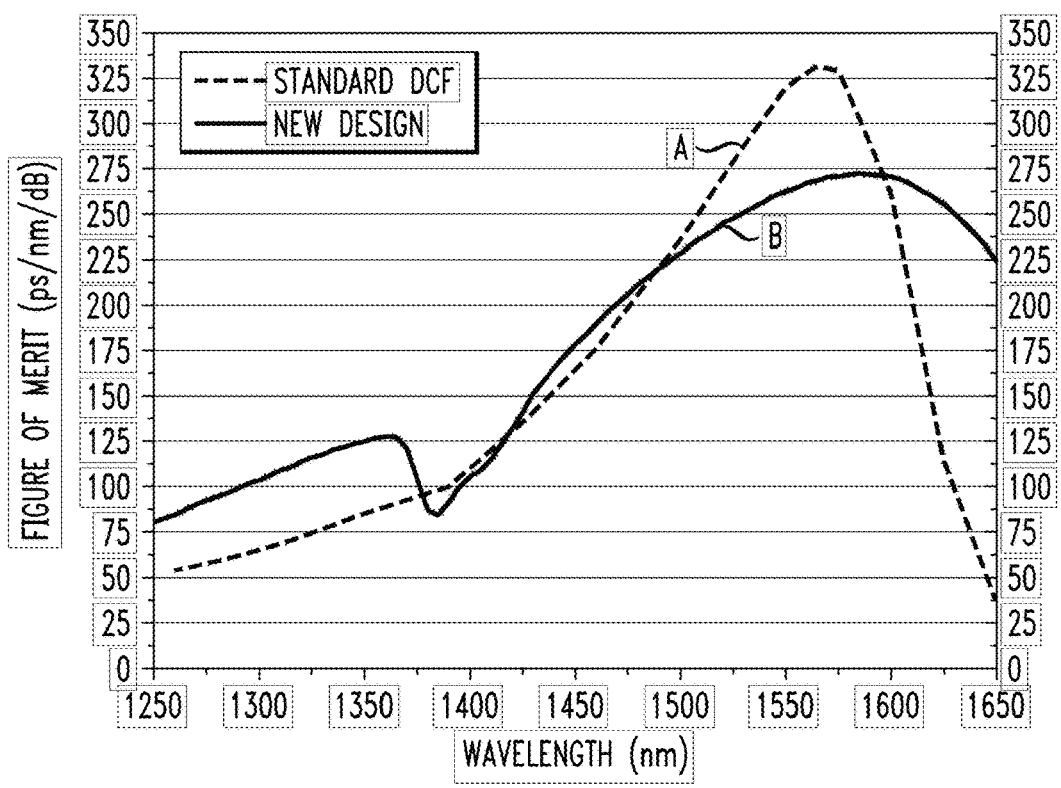
FIG. 4 is a plot of the FoM for both a prior art, standard dispersion-compensated fiber (DCF) and a specialized, dispersion-controlled optical fiber formed in accordance with the present invention.
Figure 5:
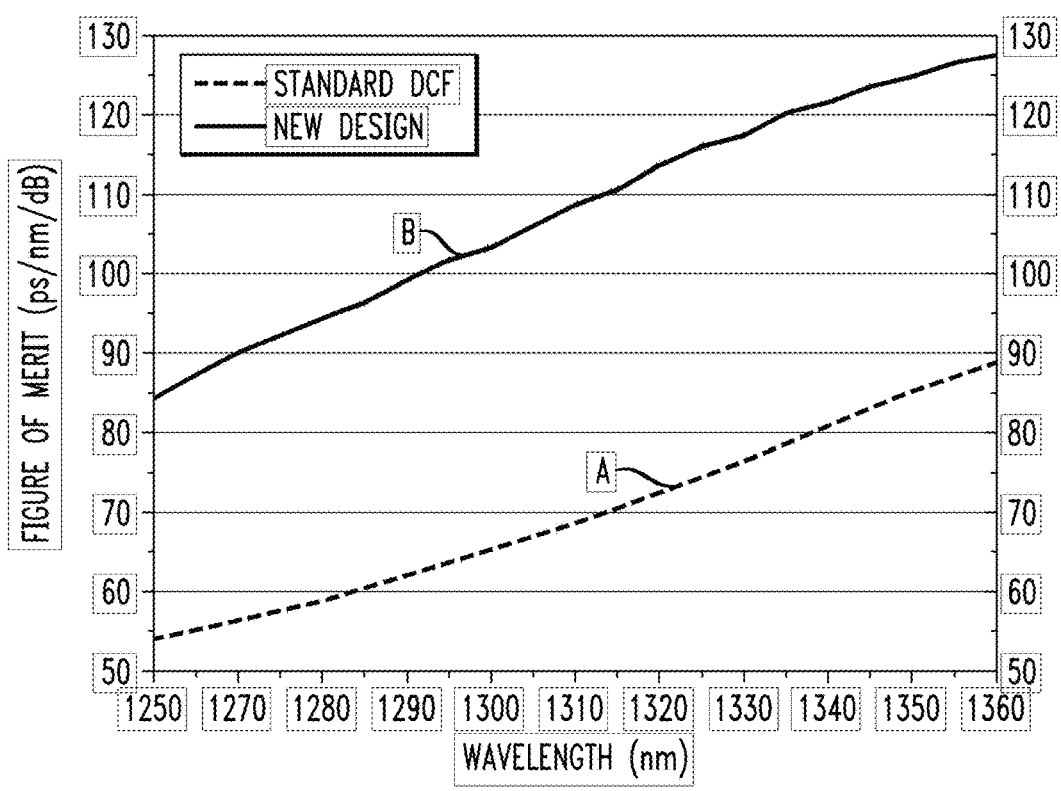
FIG. 5 is an enlargement of the lower wavelength regime of the plot of FIG. 4.

FIG. 4 is a graph of FoM over a wide spectral range from 1250 nm to 1650 nm, showing the results for a standard DCF and a specialized dispersion-controlled fiber formed in accordance with the present invention. Plot A is associated with the standard DCF and plot B is associated with the inventive specialized fiber. FIG. 5 is an enlargement of plots A and B over the limited spectral range of 1260 nm-1360 nm. Referring to FIG. 4, it is clear that the FoM for the standard DCF is non-uniform, especially in the wavelength range from about 1450 nm to 1650 nm. As shown, the FoM rises rapidly over the spectral range from about 1475 nm to 1550 nm, and then quickly drops off. This variation is unacceptable when using such a fiber in a wideband, time-based measurement system inasmuch as it requires the design of a complicated receiver to accommodate the changes in dispersion and attenuation that may otherwise saturate the receiver or introduce an unacceptable level of noise.

In contrast, plot B, which illustrates the FoM associated with an exemplary specialized, dispersion-controlled fiber of the present invention, is shown as being less variable that the FoM of the DCF over the same wavelength range. As will be discussed below, the improvement in FoM is due in large part to the configuration of a fiber that exhibits a more uniform dispersion over the spectral range of interest.

Figure 6:
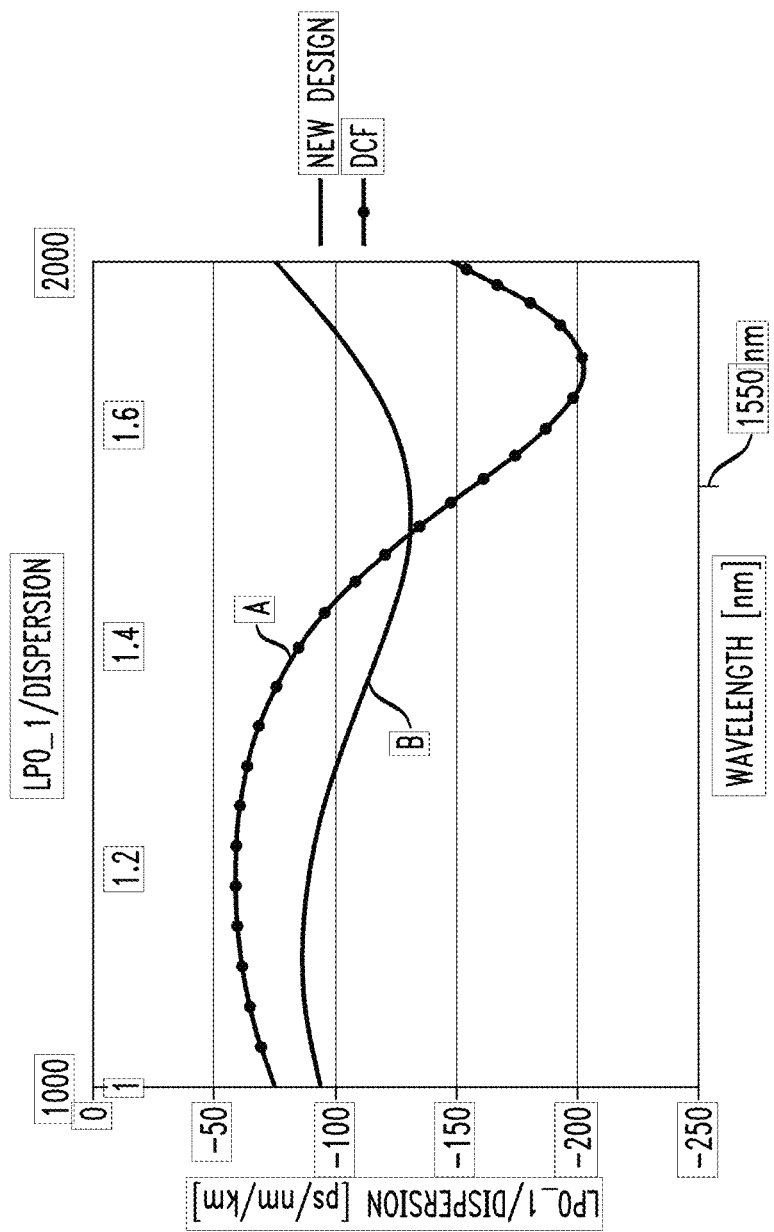
FIG. 6 contains plots of dispersion values for both a standard DCF and a specialized, dispersion-controlled fiber of the present invention.

FIG. 6 illustrates the dispersion characteristic of a specialized, dispersion-controlled fiber in comparison to the dispersion characteristic of a conventional DCF over the same spectral range. As clearly shown in plot A of FIG. 6, a conventional DCF is structured to have a relatively high (in magnitude) dispersion at the wavelength typically associated with communication applications. However, over a wider spectral range of interest for the purposes of the present invention, the dispersion may drop too low at various locations along the broad wavelength band, which makes it difficult to obtain an even spectral distribution in the time domain subsequent to the "pulse stretching".

In contrast, the dispersion exhibited by the specialized fiber of the present invention (shown as plot B in FIG. 6) exhibits less variation, in terms of both absolute value of dispersion and dispersion slope. In one or more embodiments of the present invention, a dispersion value greater than about 75 (in magnitude) is considered sufficient to spread a ps-fs pulse across a ns-length time interval. Therefore, the FoM for this specialized, dispersion-controlled fiber of the present invention is more uniform over a large spectral range, and of a sufficiently high level to overcome noise problems, so that the specialized fiber functions properly as a pulse stretcher over an extended wavelength range.

While dispersion may have a larger impact on FoM as a result of larger excursions in value as a function of wavelength, changes in attenuation are also important contributors to the FoM value.

Figure 7:
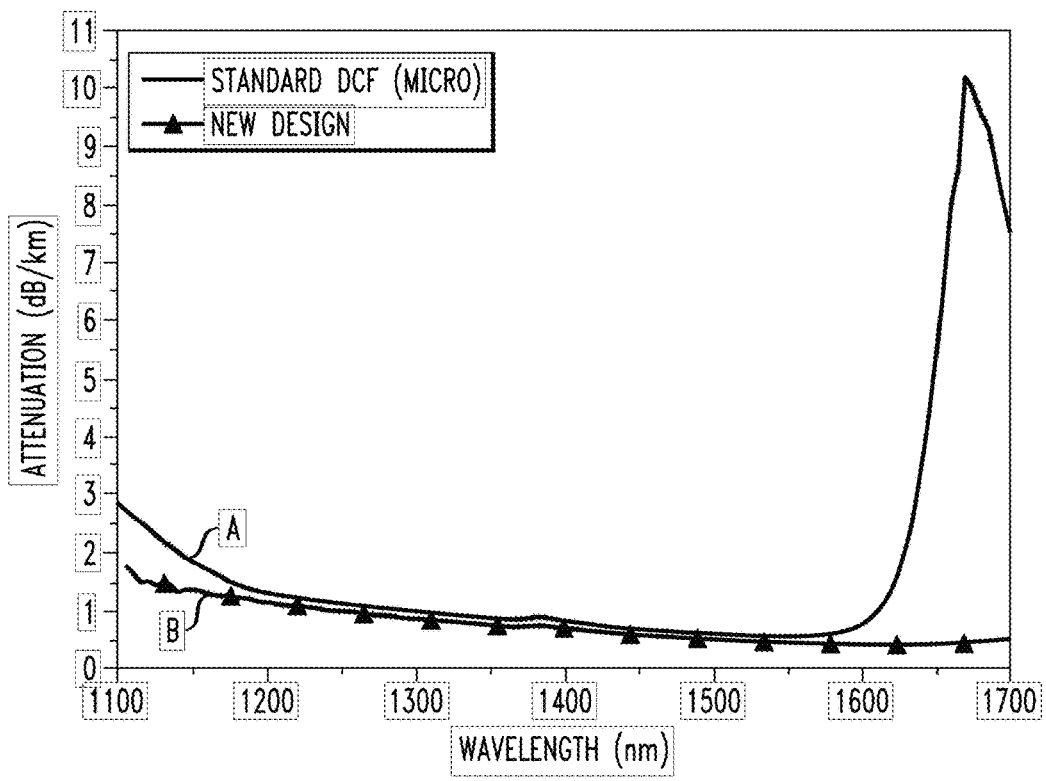
FIG. 7 contains plots of attenuation for both the standard DCF and a specialized, dispersion-controlled fiber of the present invention.

FIG. 7 is a graph showing the attenuation ($\alpha$) per km of specialized, dispersion-controlled fiber 10 as compared against a standard DCF. The attenuation (plot A) of a standard DCF includes a significant spike in attenuation at about 1650 nm that drops the FoM value. That spike is eliminated in the specialized dispersive fiber formed in accordance with the present invention, as shown in plot B. By maintaining an essentially constant attenuation, the associated FoM over the spectral range is more uniform, allowing for a more accurate analysis of received signals.

With this understanding of the dispersion, attenuation, and FoM of the specialized, dispersion-controlled fiber of the present invention, its use in pulse stretching will now be described.

Principles of Operation

A specialized, dispersion-controlled fiber of the present invention is configured to exhibit a relatively high and uniform FoM over a relatively wide spectral range. This FoM allows for an exemplary broadband pulse to be "time stretched" to spread out the various spectral components as it propagates through a section of this specialized fiber. In accordance with these aspects of the present invention, the uniformity of the FoM creates a relatively even spectral distribution in the time domain. The high value of the FoM ensures that a sufficient time interval exists between wavelengths of interest such that a standard optoelectronic photodiode device is able to sequentially measure intensity values and "quench" completely before the next measurement in time is required. As a result, the specialized dispersive fiber of the present invention is well-suited for use as a "pulse stretcher" in time-based measurement applications, where an associated receiver is thereafter used to perform a mapping between points in time and wavelength to re-create a spectral output. Input pulses utilized in these time-based applications are typically very short (for example, ps or fs in duration; in one exemplary situation, input pulses on the order of 100-200 fs may be used). In accordance with the principles of the present invention, the duration of these pulses is extended in time to the ns range (or longer) by having the pulses propagate through a section of specialized, dispersion-controlled fiber of a predetermined length, which imparts a different group velocity to the various constituent wavelengths forming the pulse, thereby "stretching" the duration of the broadband pulse as a function of time.

In the principle of time stretch, a dispersive fiber of length L stretches the input spectrum of a broadband pulse out in time, with the time-frequency relation $T(\omega)$ being determined by the group velocity dispersion $\beta_2(\omega)$ of the fiber in the following manner:

$$T(\omega) = L \int_0^\omega \beta_2(\omega') d\omega',$$

where $$\beta_2(\omega) = -\frac{\lambda^2 D(\omega)}{2\pi c}.$$

Figure 8:
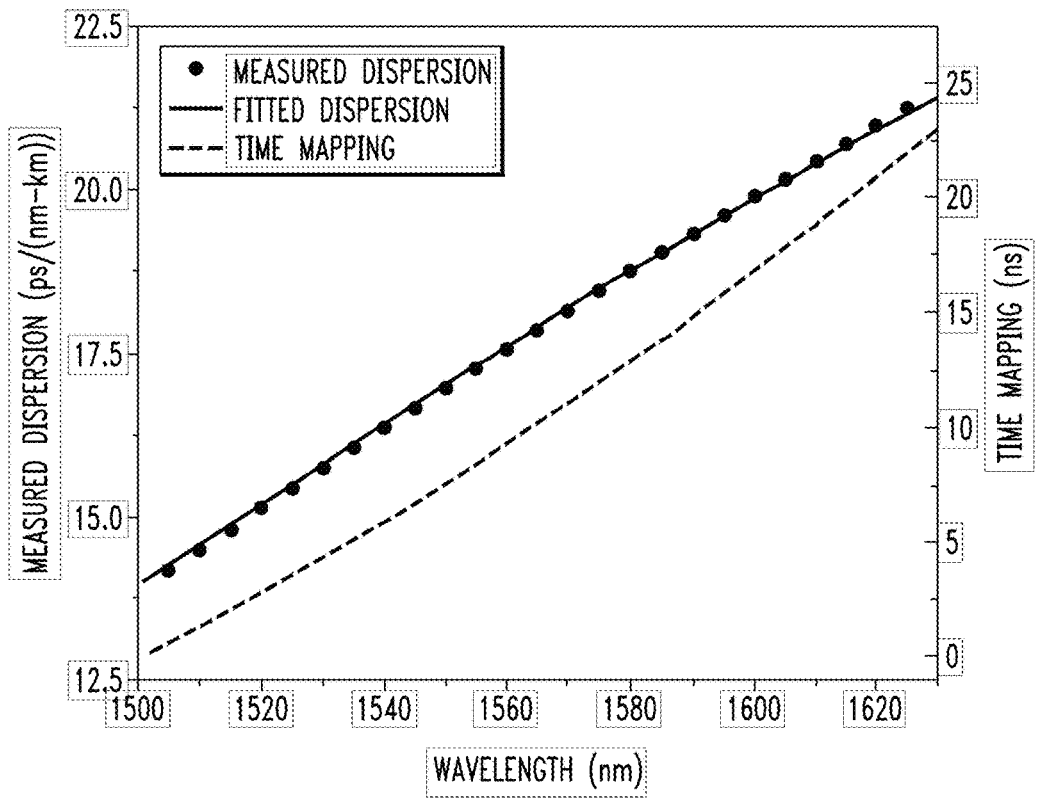
FIG. 8 illustrates the time-mapping performed by a detector component, pairing output intensities exiting from the inventive fiber as a function of time with specific wavelength values.

In accordance with the present invention, the dispersion characteristic of a specialized dispersion-controlled fiber (such as shown in FIG. 6), can be used to model the proper time mapping relationship to be utilized by the measurement system. FIG. 8 illustrates this approach, where actual dispersion measurements are shown and then fitted to a polynomial to provide the necessary relationship between time and frequency. In particular, the corresponding time mapping may be calculated numerically using the discrete time mapping equations as shown below:

$$T(\omega_i) = \sum_{n=0}^{n=i} \Delta T_n(\omega_n),$$

where $$\Delta T_n(\omega_n) = L \beta_2(\omega_n) \Delta \omega_n$$

and $$\Delta \omega_n = \omega_n - \omega_{n-1}.$$

Based on these time-mapping relationships, the detector portion of an instrumentation system application is configured to provide the mapping between points in time and the specific wavelength constituents within the broadband pulse.

In one embodiment, an exemplary receiver may be configured to include a set of time-to-wavelength mappings for different configurations of the specialized dispersion fiber (for example, fibers of different lengths, fibers of different refractive index values, core/cladding dimensions, etc.). Table I, below, shows a set of mappings between time and wavelength for a set of different specialized dispersion-controlled fibers formed in accordance with the present invention. If a time $t_0$ is chosen such that all three fibers have a mapping between $t_0$ and $\lambda_1$ as the measurement process is initiated, their different polynomial relationships then begin to map different wavelengths to the same time intervals (this relationship presumes that the measurement (sampling) interval remains constant).

TABLE I

| | Fiber A | Fiber B | Fiber C |
|---|---|---|---|
| $t_0$ | $\lambda_1$ | $\lambda_1$ | $\lambda_1$ |
| $t_1$ | $\lambda_2$ | $\lambda_b$ | $\lambda_B$ |
| $t_2$ | $\lambda_3$ | $\lambda_c$ | $\lambda_C$ |
| $t_3$ | $\lambda_4$ | $\lambda_d$ | $\lambda_D$ |
| $t_4$ | $\lambda_5$ | $\lambda_e$ | $\lambda_E$ |
| . | . | . | . |
| . | . | . | . |
| . | . | . | . |
| $t_N$ | $\lambda_X$ | $\lambda_Y$ | $\lambda_Z$ |

Thus, it is contemplated that a detector may be configured a priori to include a number of different polynomials that fit the points in time to the wavelengths as a function of the specific properties (e.g., L, $\beta_2$, etc.) of the actual dispersive fiber element used in a given instrumentation application, where each polynomial provides a specific mapping, as noted above.

It is proposed that the specialized, dispersion-controlled fiber formed in accordance with the present invention, which exhibits a relatively high and flat FoM over a wide spectral range, best provides the time stretching property for optical systems utilizing ultrashort pulses of broadband light for sensing/measurement application. One exemplary application, an optical spectrometer, is now discussed in detail below.

Exemplary Application of Specialized Dispersive Fiber—Optical Spectrometer

Optical spectrometers use light sources for the detection and quantification of emission or absorption of radiation by matter (e.g., individual molecules in analysis of gas-phase or liquid-phase compounds). The radiation from such light sources is emitted or absorbed with a particular energy determined by transitions occurring in the molecules of the analyte. In general terms, spectrometers include a dispersive element to separate the radiation into different wavelengths, where each wavelength that passes through the analyte is affected differently and these differences are recognized by an optical receiver and thereafter analyzed. For decades, the dispersive element in these instruments has comprised a diffraction grating or like device (e.g., prism), well-known in the art for separating a broadband optical beam into its constituent wavelength components.

Unfortunately, conventional grating-based spectrometers may be slow in operation inasmuch as they either employ moving components (e.g., a rotating grating or translating diffraction slit) to sequentially pass different wavelengths to the detector, or rely on a detector array (such as a charge-coupled device (CCD)) with a limited frame rate (typically less than 1 kHz) to simultaneously measure the intensity of a set of parallel outputs at the different wavelengths.

In accordance with the principles of the present invention, a dispersive Fourier transform-based optical spectrometer is based upon the utilization of a specialized, dispersion-controlled fiber as a pulse stretcher that is particularly configured to have a relatively high and uniform FoM over a large wavelength range.

As will be described in detail below, the inventive approach to improving the performance of an optical spectrometer is to use a short, broadband pulse as a light source in combination with the inventive specialized, dispersion-controlled fiber that stretches the broadband pulse in time such each constituent wavelength within the broadband pulse arrives at the detector at a different point of time in sequence that is distinguishable by the detector. The detector itself is configured to operate fast enough to detect changes in light intensity measured as a function of time, and then correlate the receipt time to wavelength (Fourier transform) to provide as an output the intensity across the full spectrum (i.e., per a specific time-to-wavelength mapping as shown in Table I). The resulting configuration is a spectrometer that operates at least as fast as conventional arrangements, while not requiring any moving parts.

In one or more configurations of this optical spectrometer embodiment of the present invention, a broad band light source is formed to comprise a laser source capable of generating short (e.g., ps or fs) pulses, and a section of highly-nonlinear fiber (HNLF) or other nonlinear element to create a broadband, continuum output pulse that encompasses the desired wavelength range of interest (for example, 1000-2000 nm, with one spectral range of particular interest extending between 1200-1700 nm).

Moreover, it is also preferable that the light source be configured as a "continuum" source providing a broadband output pulse that includes a relatively wide wavelength range. Additionally, the detector component of the inventive arrangement is preferably configured a priori to provide a mapping between arrival time and wavelength so that the intensities of the arriving pulse components are assigned to their proper constituent wavelengths (i.e., so that an accurate Fourier transform is generated).

Figure 9:
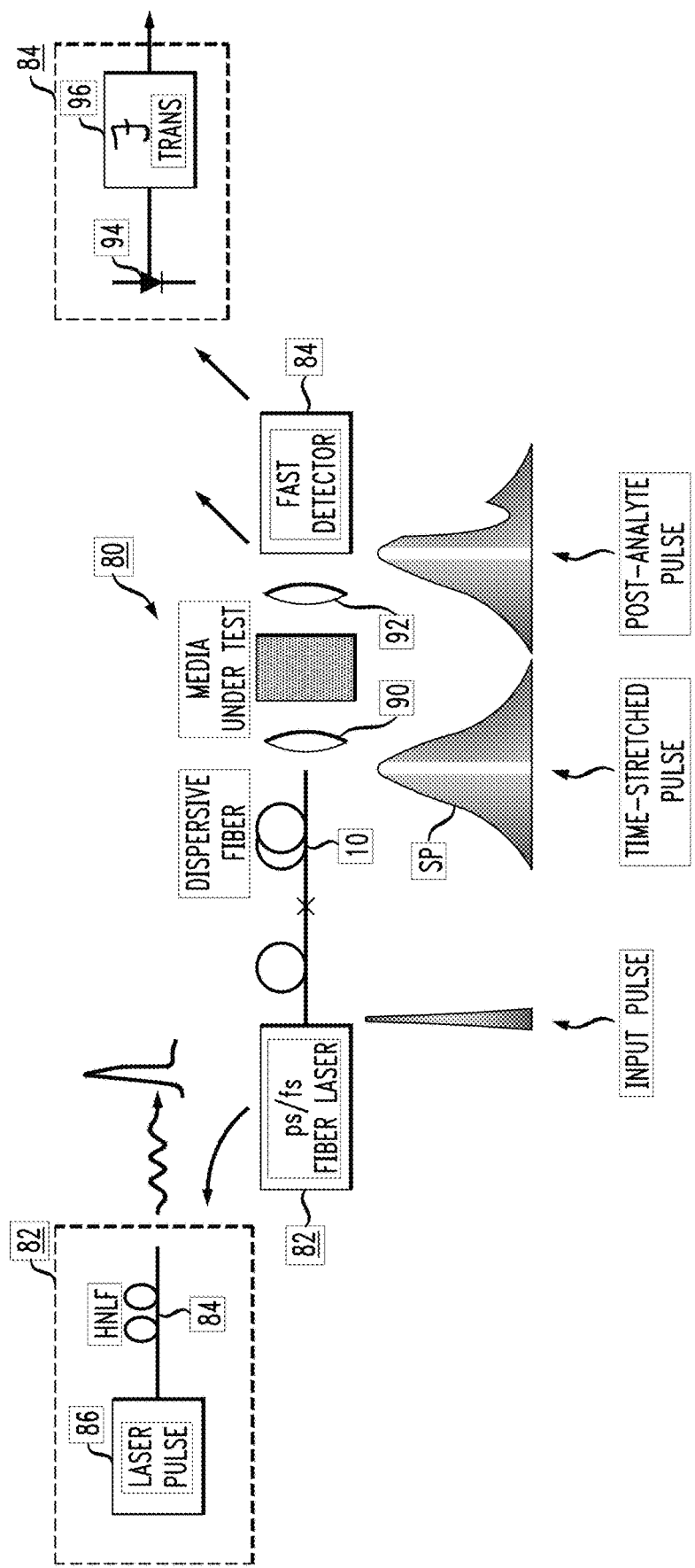
FIG. 9 illustrates an exemplary optical spectrometer, utilizing the specialized fiber of the present invention as a pulse stretcher in the Fourier transform configured spectrometer.

FIG. 9 illustrates an exemplary embodiment of an optical spectrometer 80 formed in accordance with the principles of the present invention. Optical spectrometer 80 is shown as comprising a pulsed broad band light source 82 and a detector 84, with a section of specialized, dispersion-controlled fiber 10 of the present invention disposed between source 82 and detector 84 and utilized to provide time stretching of the extremely short, broadband pulses created by source 82. As discussed below, each component is particularly configured to provide a Fourier transform-based spectrometer output that is similar in results to conventional spectrometers, but without the need for moving parts or arrays of detectors to perform the measurements. En this exemplary embodiment, spectrometer 80 is used to perform an optical analysis of a specific sample (media). For example, spectrometer 80 may be used to illuminate a given gaseous sample and determine its chemical constituents.

As mentioned above, in order to provide an optimum response over the entire spectral range of interest, it is necessary to utilize a light source that creates a short pulse (e.g., ps, fs) exhibiting the proper characteristics for this purpose. Thus, in accordance with one or more configurations of this embodiment of the present invention, light source 82 preferably comprises a continuum source, which is particularly configured to provide as an output a spectrum extending beyond the Fourier-limited spectral width given by the pulse duration. Broad band light source 82 preferably includes a section of highly-nonlinear fiber (HNLF) 86 disposed at the output of a laser pulse source 88. As is known in the art, HNLF 86 provides higher-order soliton compression and functions as a dispersive wave generator, thus creating the broadband output pulse of a continuum of wavelengths. In one exemplary configuration, a spectral range of 1000-2000 nm may be desired, with a specific range of 1200-1700 nm useful for many specific analysis purposes.

The details of the characteristics of the specific HNLF fiber utilized in the pulsed source of a specific embodiment of the present invention may be particularly configured by the user to create a spectral continuum that extends across the wavelength range of interest for the specific analyte being studied. It is to be understood that any other continuum generation techniques may be used to provide the short, broadband pulses as used in the spectrometer of the present invention.

Continuing with reference to FIG. 9, the short (e.g., ps or ns), broadband pulse created by source 82 is then introduced into specialized, dispersion-controlled fiber 10, which functions in the manner described above to "time stretch" the pulse prior to passing the pulse through the sample being studied. FIG. 9 illustrates a stretched pulse SP created by specialized fiber 10, where this pulse is then directed into the sample S being studied. In the particular embodiment shown in FIG. 9, the time-stretched pulse SP is passed through a first lens 90 and focused to illuminate sample S. The use of pulse stretching thus results in each wavelength constituent within the broadband pulse SP passing through the sample during a different instance in time.

The optical beam exiting through sample S may be passed through a second lens 92 to provide maximum coupling into a photodetecting device 94 within detector 84. In an alternative embodiment (not shown), the light reflected by the analyte may be used to perform the analysis instead of the light passing through the analyte. In either case, the same principles of the present invention, and spectrometry in general, apply. As mentioned above, detector 84 needs to be a "fast" detector, meaning that it needs to collect measurements from a suitable number of points in time in order to provide an accurate spectral response. In accordance with this embodiment of the present invention, a Fourier transform component 96 within detector 84 is used to provide the one-to-one mapping between time and wavelength as discussed above in association with FIG. 7, creating the desired wavelength-based optical intensity results. The resultant spectrum is then provided as the output of optical spectrometer 80, where the characteristic spectrum is used to analyze the properties of sample S. In particular, detector 84 needs to be properly configured to provide an accurate time mapping between the intensity measurements and associated wavelengths in order to generate an accurate spectral response.

Figure 10:
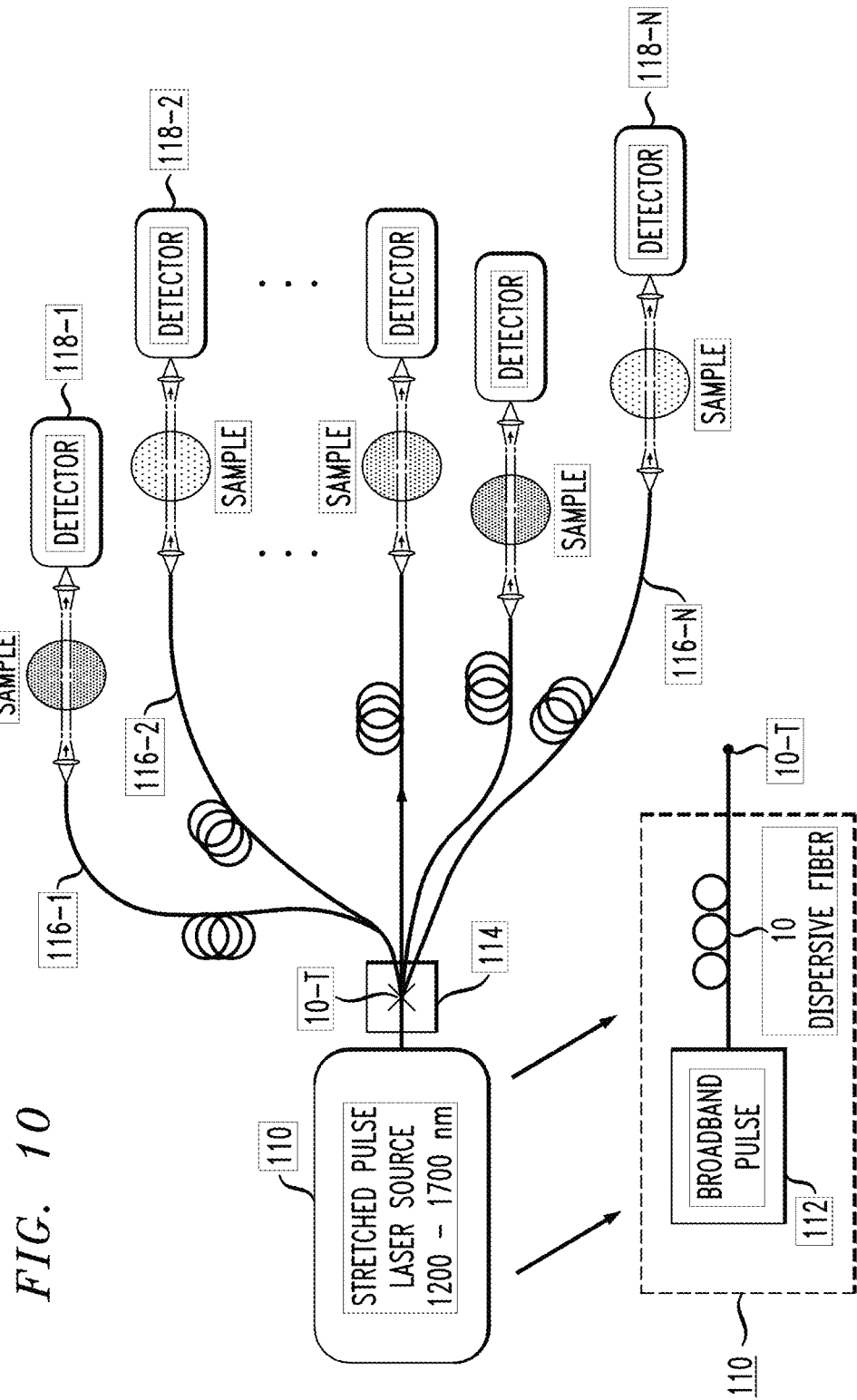
FIG. 10 is a block diagram of an exemplary multi-detector configuration of an optical spectrometer formed in accordance with the present invention.

FIG. 10 is a diagram of an exemplary system 100 based on the optimized components described above. In the system of FIG. 10, a single source 110 is used to provide the necessary "stretched" (in time duration) pulse used in the spectrometer application to probe a plurality of specimens. Source 110 is formed to include a laser pulse source 112 and specialized, dispersion-controlled fiber 10 configured in the manner described above to provide time-stretched broadband pulses.

In the embodiment shown in FIG. 10, a far-end termination 10-T of specialized fiber 10 is provided as an input to a 1:N splitter 114, which then launches the stretched pulse output of fiber 10 into a set of separate delivery fibers 116-1, 116-2 . . . 116-N. Single mode fibers are preferably utilized for these delivery fibers, allowing for lengths up to several hundreds of meters to be used without suffering significant pulse distortion/attenuation. As shown in FIG. 10, each separate delivery fiber 116-i is used to analyze a different sample S-i, with each beam provided as an input to an associated detector 118-i.

The ability to configure such a fiber-based "fast" spectrometer allows for several different, well-separated measurement points to all use a single source, saving considerable system cost. The flexible delivery fiber allows for measurements to be performed in difficult-to-access locations. The output optics associated with each detector in the system may be optimized as a function of the specifics of the fast detector system, the particular specimen being analyzed, etc., the optimization including the spot size of the beam directed through the specimen. Additionally, each output beam can be spatially scanned over an array of measurement points.

It will be apparent to those skilled in the art that various modifications and variations can be made to the present invention without departing from the spirit or scope thereof. Thus, it is intended that the present invention cover the modifications and variations of the above-described embodiments, all of which are considered to fall within the spirit and scope of the invention as defined by the claims appended hereto.

What is claimed is:

1. An optical fiber comprising
a core region including
an up-doped central core area having a diameter in the range of 2-4 µm;
a down-doped trench surrounding the up-doped central core area and having a diameter in the range of 5-9 µm, where the change in refractive index $\Delta n_1$ between the up-doped central core area and the down-doped trench has a value of at least 0.020; and
an outer core region surrounding the down-doped trench and having a thickness of about 4 µm such that the complete core region exhibits a diameter in the range of 9-13 µm, the outer core region having a refractive index value greater than the down-doped trench with a $\Delta n_2$ between the trench and the outer core region being in the range of about 0.005-0.015, the combination of $\Delta n_1$, $\Delta n_2$, diameters of the up-doped central core area and the down-doped trench and thickness of the outer core region creating a uniform chromatic dispersion D of a value greater than 50 ps/nm/km over a spectral range of 1000-2000 nm;
a cladding region surrounding the core region and including
an inner cladding layer having a first refractive index value; and
an outer cladding layer surrounding the inner cladding layer and having a second refractive index value greater than the first refractive index value; and
a coating layer surrounding the cladding region, where the thicknesses of each region and their respective index values are selected to form an optical fiber exhibiting a relatively high and uniform figure-of-merit (FoM) over a broad spectral range, where FoM is defined as:

$$FoM=|D|/\alpha,$$

where |D| is an absolute value of the chromatic dispersion in a propagating optical signal and $\alpha$ is attenuation of the propagating optical signal, both |D| and a measured as a function of wavelength.

2. The optical fiber of claim 1 wherein $\Delta n_1$ is within the range of about 0.030-0.040.

3. The optical fiber of claim 2 wherein $\Delta n_1$ exhibits a value of about 0.037.

4. The optical fiber of claim 1 wherein $\Delta n_2$ is within the range of about 0.005-0.015.

5. The optical fiber of claim 4 wherein $\Delta n_2$ exhibits a value of about 0.090.

6. The optical fiber of claim 1 wherein the complete core has a diameter on the order of about 9-13 μm.

7. The optical fiber of claim 6 wherein the complete core has a diameter of about 11 μm.

8. The optical fiber as defined in claim 1 wherein the fiber is configured to exhibit a relatively high and uniform FoM over a spectral range of 1000 nm to 2000 nm.

* * * * *